(12) United States Patent
Vaucher

(10) Patent No.: US 11,675,047 B2
(45) Date of Patent: Jun. 13, 2023

(54) SYSTEM AND METHOD FOR LOCAL OSCILLATOR DRIFT ESTIMATION AND COMPENSATION IN CASCADED SENSORS

(71) Applicant: NXP B.V., Eindhoven (NL)

(72) Inventor: Cicero Silveira Vaucher, Eindhoven (NL)

(73) Assignee: NXP B.V., Eindhoven (NL)

( * ) Notice: Subject to any disclaimer, the term of this patent is extended or adjusted under 35 U.S.C. 154(b) by 275 days.

(21) Appl. No.: 17/011,261

(22) Filed: Sep. 3, 2020

(65) Prior Publication Data

US 2022/0065986 A1 Mar. 3, 2022

(51) Int. Cl.
*G01S 7/40* (2006.01)
*G01S 7/35* (2006.01)
(Continued)

(52) U.S. Cl.
CPC ............. *G01S 7/40* (2013.01); *G01S 7/352* (2013.01); *G01S 7/4017* (2013.01); *G01S 13/0209* (2013.01); *G01S 13/34* (2013.01); *G01S 7/02* (2013.01); *G01S 7/028* (2021.05); *G01S 7/032* (2013.01); *G01S 7/356* (2021.05); *G01S 7/4021* (2013.01); *G01S 7/41* (2013.01); *G01S 13/4418* (2013.01); *G01S 13/4454* (2013.01);
(Continued)

(58) Field of Classification Search
CPC .......... G01S 7/40; G01S 7/352; G01S 7/4017; G01S 13/0209; G01S 13/34; G01S 7/356; G01S 2013/93271; G01S 2013/93272; G01S 7/032; G01S 7/4021; G01S 13/4418; G01S 13/4454; G01S 13/584; G01S 13/931; G01S 7/028; H01Q 1/3233; H01Q 21/28
See application file for complete search history.

(56) References Cited

U.S. PATENT DOCUMENTS 9,733,340 B2 8/2017 Rao et al.
2012/0288033 A1* 11/2012 Stirling-Gallacher .... G01S 7/03
375/322

(Continued)

OTHER PUBLICATIONS

L. Maurer, G. Haider and H. Knapp; 77GHz SiGe Based Bipolar Transceivers for Automotive Radar Applications—An Industrial Perspective, IEEE 9th International New Circuits and Systems Conference (NEWCAS), 2011.

(Continued)

*Primary Examiner* — Erin F Heard
*Assistant Examiner* — Ismaaeel A. Siddiquee

(57) ABSTRACT

A frequency modulated continuous wave (FMCW) radar system includes an antenna array having C antennas where (C=A+B−1), a first integrated circuit (IC) device including A first sensor inputs, and a second IC device including B second sensor inputs. The first sensor inputs are coupled to a first A of the antennas, and the second sensor inputs are coupled to a last B of the antennas such that a common one of the first sensor inputs and a common one of the second sensor inputs are both coupled to a common antenna. Each IC device receives reflected signals on each sensor input, and mixes the reflected signals to associated baseband signals based upon a local oscillator (LO) signal. Each LO signal has a different phase shift. The LO signals are based upon a common LO signal.

20 Claims, 7 Drawing Sheets

(51) Int. Cl.
  *G01S 13/02* (2006.01)
  *G01S 13/34* (2006.01)
  *H01Q 1/32* (2006.01)
  *G01S 13/931* (2020.01)
  *G01S 7/02* (2006.01)
  *G01S 13/44* (2006.01)
  *G01S 7/41* (2006.01)
  *H01Q 21/28* (2006.01)
  *G01S 13/58* (2006.01)
  *G01S 7/03* (2006.01)

(52) U.S. Cl.
  CPC ........... *G01S 13/584* (2013.01); *G01S 13/931* (2013.01); *G01S 2013/93271* (2020.01); *G01S 2013/93272* (2020.01); *H01Q 1/3233* (2013.01); *H01Q 21/28* (2013.01)

(56) References Cited

U.S. PATENT DOCUMENTS

| | | | | |
|---|---|---|---|---|
| 2018/0172813 | A1* | 6/2018 | Rao | G01S 13/343 |
| 2019/0131981 | A1* | 5/2019 | Vaucher | H03L 7/0992 |
| 2019/0346544 | A1* | 11/2019 | Hammes | G01S 13/878 |
| 2021/0072350 | A1 | 3/2021 | Loesch et al. | |
| 2021/0311164 | A1* | 10/2021 | Schmalzl | G01S 13/584 |

OTHER PUBLICATIONS

Test report No. 1-7342/14-01-02_AnnexB, CETECOM ICT Services; Mando Corporation, Source: FCC website: https://apps.fcc.gov/oetcf/eas/reports/GenericSearch.cfm; Jul. 7, 2014.

* cited by examiner

SYSTEM AND METHOD FOR LOCAL OSCILLATOR DRIFT ESTIMATION AND COMPENSATION IN CASCADED SENSORS

FIELD OF THE DISCLOSURE

This disclosure generally relates to automotive radar systems, and more particularly relates to local oscillator (LO) drift estimation and compensation in cascaded sensors in an automotive radar system.

BACKGROUND

Radar systems are becoming increasingly common in the automotive industry, being used, for example, as sensors for assisted parking, automatic cruise control speed adjustment (adaptive cruise control), headway alert, collision warning and mitigation, and brake support. Radar systems perform detection and ranging by transmitting an electromagnetic wave, such as a pulse, from a transmission antenna and measuring the time taken for the reflected signal to be detected at a receiving sensor. The amount of time taken for a reflected signal to reach an obstacle and be reflected back provides an indication of the range of that obstacle from the radar system.

Frequency modulated continuous wave radar (FMCW) systems emit series of pulses (detection signals) to obtain a time resolved range profile of the space around the radar systems. Each detection signal comprises a continuous electromagnetic signal that varies between an initial frequency and a final frequency over a period of time. The bandwidth of the detection signals is the difference between the initial frequency and the final frequency. The detection signals are reflected off of objects in the detection space around the FMCW radar systems. The reflected signals are detected by receivers of the FMCW radar systems.

SUMMARY

A frequency modulated continuous wave (FMCW) radar system may include an antenna array having (C=A+B−1) antennas, a first integrated circuit (IC) device including A first sensor inputs, and a second IC device including B second sensor inputs. The first sensor inputs may be coupled to a first A of the antennas, and the second sensor inputs may be coupled to a last B of the antennas such that a common one of the first sensor inputs and a common one of the second sensor inputs are both coupled to a common antenna. Each IC device may receive reflected signals on each sensor input, and mixes the reflected signals to associated baseband signals based upon a local oscillator (LO) signal. Each LO signal may have a different phase shift. The LO signals may be based upon a common LO signal.

The FMCW radar system may include a processor configured to receive the baseband signals, to determine a difference between the phase shifts based upon the common baseband signals, and to correct at least one of the sets of baseband signals based upon the difference between the phase shifts.

In determining the difference between the phase shifts, the processor may be further configured to determine a delay time between the first common baseband signal and the second common baseband signal.

In correcting the at least one of the sets of baseband signals, the processor may be further configured to delay the at least one of the first baseband signals and the second baseband signals by the delay time.

The IC device devices may be further configured to digitize the baseband signals, where outputting the baseband signals may comprise outputting the digitized signals.

The processor may be further configured to perform a Fast Fourier Transform (FFT) on the digitized baseband signals to obtain transformed signals including common transformed signal associated with the common sensor inputs.

In determining the difference between the phase shifts, the processor may be further configured to determine a complex phase shift between common first transformed signal and the common second transformed signal in a frequency domain.

In correcting the at least one of the sets of baseband signals, the processor may be further configured to shift a phase of at least one of the sets of transformed baseband signals based upon the complex phase shift.

The first IC device may be further configured to generate the first LO signal, and the second IC device may be further configured to receive the second LO signal from the first IC device.

The antennas of the antenna array may be arranged in a line and each antenna is spaced apart from a next antenna at a distance of lambda/2 or more, where lambda is a wavelength of a carrier wave of a FMCW chirp of the FMCW radar system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application.

In this ID, we propose a technique to estimate and compensate the LO phase difference between a Master and Slave ICs in cascaded systems using MMICs that have a shared LO input and output port. After measurement, the systematic LO phase offset can be compensated on one of the two sets of IF signals, so that the resulting sets of 2×4 RX signals are free of LO offsets.

The concept can be expanded to any number of Slaves.

Figure 1:
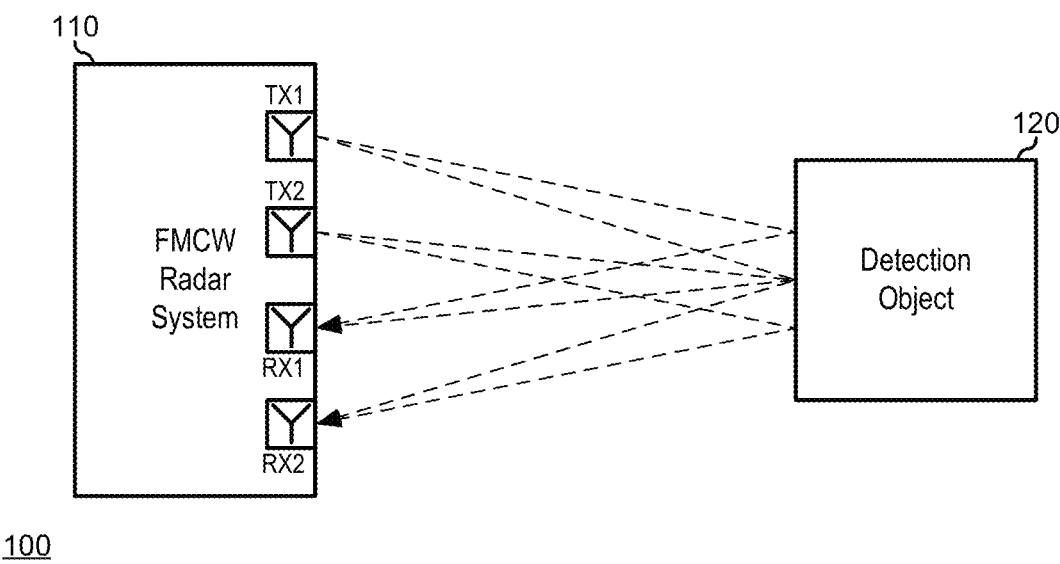
FIG. 1 is a block diagram of a radar system according to an embodiment of the present disclosure.

FIG. 1 illustrates a radar system 110 configured to provide for detection and ranging of an object 120 in a space 100 around the radar system. Radar system 110 is a MIMO radar system, including multiple transmit antennas and multiple receive antennas. Radar system 110 is configured to emit a series of encoded detection signals on each transmit antenna, to receive the reflected signals from object 120, and to determine the range to the object and the incident angle to the object. The angular resolution of radar system 110 is directly related to the total antenna aperture, which is determined by the number of receive antennas and their localization with respect to each other.

In order to avoid so-called grating lobes in the angular response (i.e. false target detection at certain angular positions), the receive antennas of radar system 110 are typically located at a distance of lambda/2 (λ/2) apart, or less, where A is the wavelength of the carrier signal of the detection signal, that is, the wavelength associated with the middle frequency of the detection signals. Typical MIMO radar systems may have apertures in the range of 6 to 10 lambda, which, in combination with the lambda/w criteria for antenna placement, leads to antenna arrays of 12 to 20 receive antennas. It will be understood that in practice, a distance of more than lambda/2 (λ/2) may be utilized as needed or desired.

The detection signal from each receive antenna is down-converted to an intermediate frequency (IF) baseband frequency and translated to the digital domain by analog-to-digital converters (ADCs) before being further processed to determine distance information, speed information, and incident angle information for object 120. In a particular embodiment, radar system 110 is implemented using one or more radio frequency (RF) integrated circuits (IC) or monolithic microwave integrated circuits (MMICs). Here, a particular IC or MMIC may provide a transmit (TX) capability with a number of transmit channels, may provide a receive (RX) capability with a number of receive channels, or may provide a transmit and receive (TX/RX) capability. By utilizing various ICs and MMICs, a designer of radar system 110 can adapt the design as needed or desired.

Figure 2:
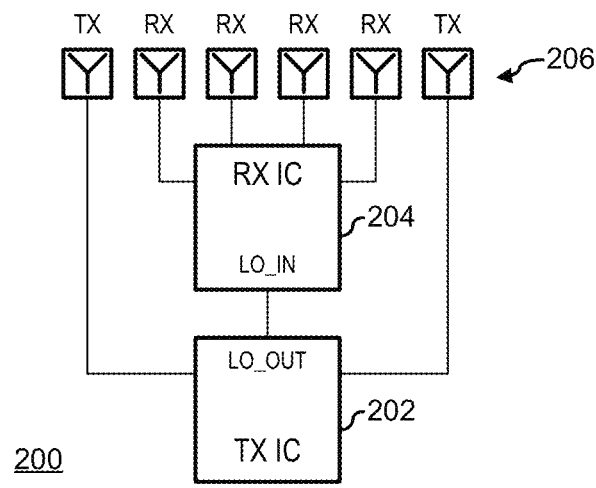
FIG. 2 illustrates various cascaded radar systems of the prior art.
Figure 2:
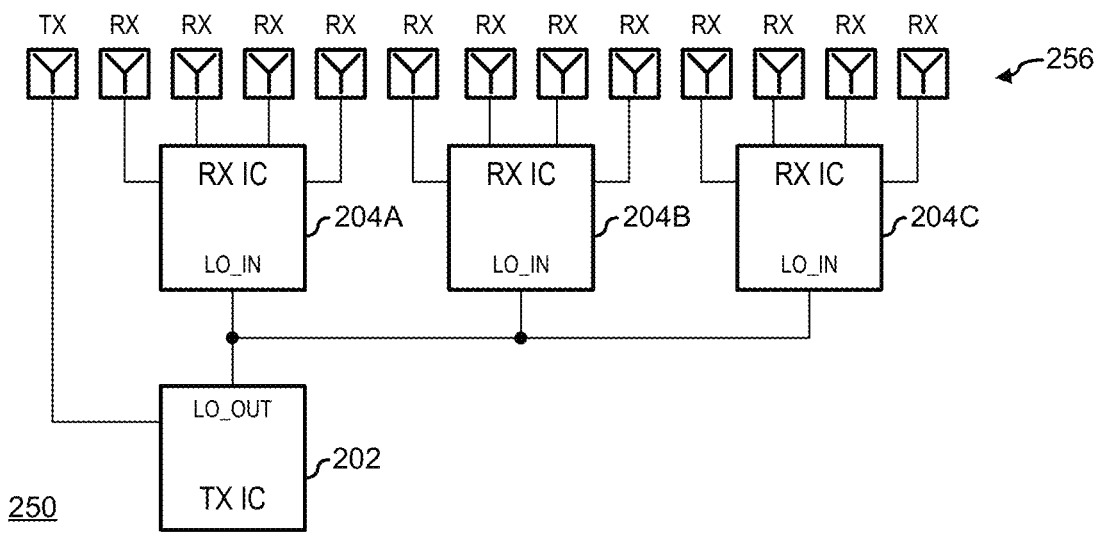

FIG. 2 illustrates various embodiments of cascaded radar systems 200 and 250, similar to radar system 100. Radar systems 200 and 140 are designed utilizing a transmit IC 202, and one or more receive ICs 204. For example, transmit IC 202 may be configured to include two transmit channels and to provide an output for a local oscillator (LO) signal, and receive IC 204 may be configured to include four receive channels and to provide an input for the LO signal from the transmit IC. Radar system 200 has an antenna array 206 with six antennas. Antenna array 206 includes two transmit antennas to emit detection signals from the two transmit channels of transmit IC 202, and includes four receive antennas to receive reflected signals from the four receive channels of receive IC 204. Receive IC 204 receives the LO signal from transmit IC 202. Radar system 250 has an antenna array 256 with 13 antennas. Antenna array 146 includes a single transmit antenna to emit a detection signal from one of the transmit channels of transmit IC 202, and includes 12 receive antennas. Here, four receive antennas are connected to a first receive IC 204A, four receive antennas are connected to a second receive IC 204B, and four receive antennas are connected to a third receive IC 204C. Receive ICs 204A, 204B, and 204C each receive the LO signal from transmit IC 202. It will be understood that transmit IC 202 will include other connections and interfaces (not illustrated), such as a crystal or clock input, one or more synchronization signal to synchronize the operation of the transmit IC with the one or more receive ICs 204, and other inputs or outputs, as needed or desired. It will be understood that receive IC 204 will include other connections and interfaces (not illustrated), such as one or more RF signal output, one or more IF signal output, for example where the receive IC includes down-converters to mix the received signals from the receive channels to the IF frequency, one or more data output, for example where the receive IC includes ADCs to digitize the IF signals, one or more synchronization signal to synchronize the operation of the receive IC with transmit IC 202 and with other receive ICs if present, and other inputs or outputs, as needed or desired.

Figure 3:
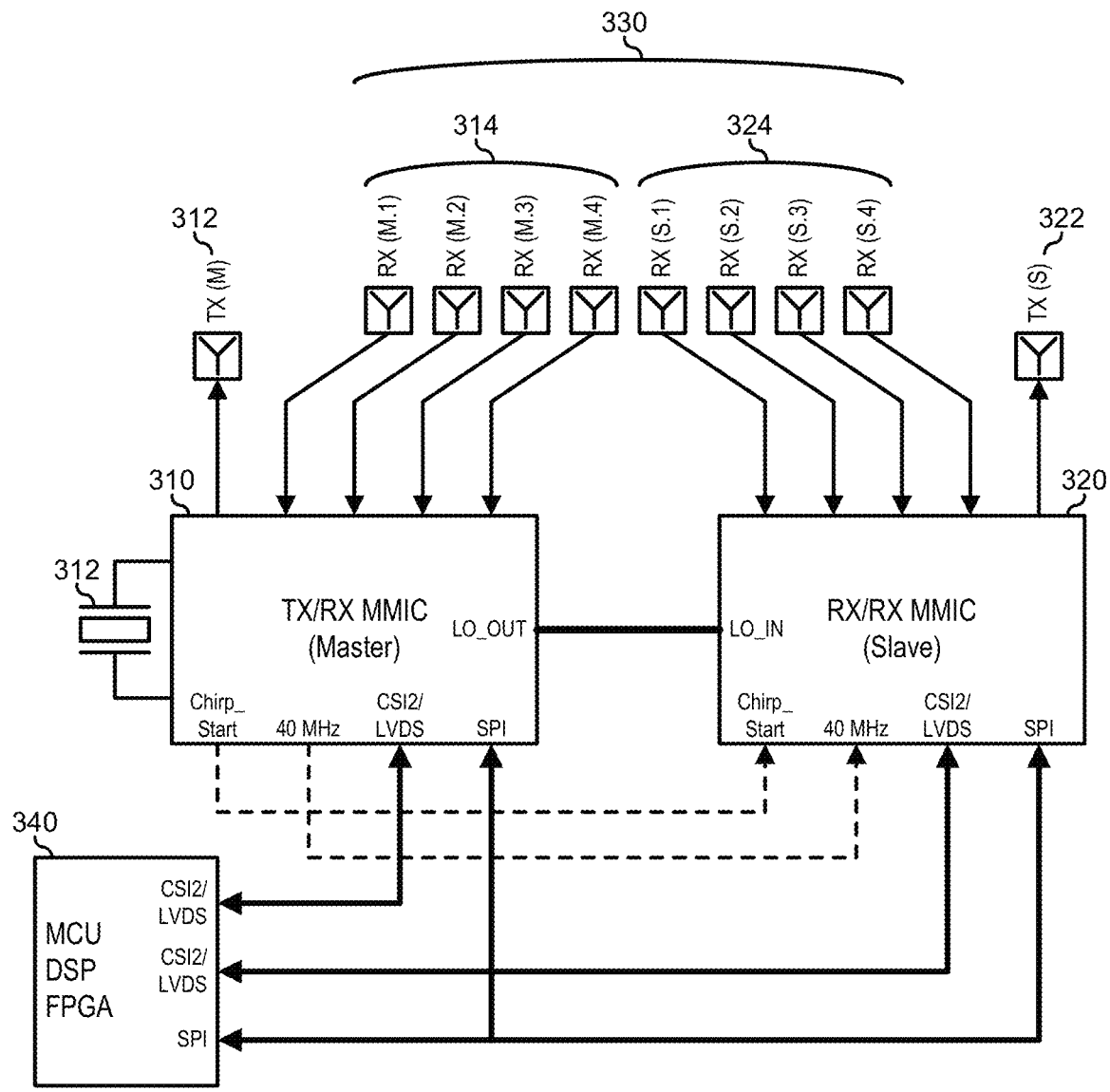
FIGS. 3 and 4 are block diagrams of radar systems of the prior art.

FIG. 3 illustrates a radar system 300 similar to radar system 100. Radar system 300 includes a first transmit/receive IC 310, a second transmit/receive IC 320, and a signal processing IC 340. Transmit/receive ICs 310 and 320 represent RF ICs or MMICs which may more may not be identically specified, as needed or desired. Transmit/receive ICs 310 and 320 each include at least one transmit channel, and at least four receive channels. The transmit channel of IC 310 is connected to a transmission antenna 312, and the four receive channels of IC 310 are connected to an antenna array 314 of four receive antennas. In particular, the four receive antennas of antenna array 314 are designated, from left to right, as RX(M.1), RX(M.2), RX(M.3), and RX(M.4), and each antenna located at a lambda/2 spacing from the next antenna, as described above. Similarly, the transmit channel of IC 320 is connected to a transmission antenna 322, and the four receive channels of IC 320 are connected to an antenna array 324 of four receive antennas. In particular, the four receive antennas of antenna array 324 are designated, from left to right, as RX(S.1), RX(S.2), RX(S.3), and RX(S.4), and each antenna is located at a lambda/2 spacing from the next antenna. Moreover, antenna RX(M.4) is located at the lambda/2 spacing from antenna RX(S.1), such that the antennas of antenna arrays 314 and 324 are together configured as a single receive antenna array 330 of eight antennas.

IC 310 further includes a clock or crystal input to which, in the illustrated example, a crystal is connected. The crystal is utilized by IC 310 as an input to derive a LO signal. The LO signal derived from the crystal is utilized internally in IC 310 to generate a detection signal to be emitted on transmit antenna 312, and in the down-converting of the detected signals from receive antenna array 314 to the baseband frequency. The LO signal is also provided to a LO output (LO_OUT) of IC 310. In this regard, IC 310 may be referred to as a "master" IC. IC 320 includes a LO input (LO_IN) to receive the LO signal from IC 310. In this regard, IC 320 may be referred to as a "slave" IC. The LO signal from LO_IN is utilized internally in IC 320 to generate a detection signal to be emitted on transmit antenna 322, and in the down-converting of the detected signals from receive antenna array 324 to the baseband frequency. IC 310 includes a chirp_start output that is provided to a chirp_start input of IC 320 to synchronize the start of the detection signals by IC 310 with the start of the detection signals by IC 320. The details of generating FMCW detection signals and the down-converting of detected signals are known in the art, and will not be further described herein except as needed to illustrate the current embodiments.

The crystal is further utilized by IC 310 to derive a 40 MHz clock for the operation of ADCs in the IC that digitize the down-converted detected signals from antenna array 314. IC 310 includes a 40 MHz output that is connected to a 40 MHz input of IC 320 for the operation of ADCs in IC 320 that digitize the down-converted detected signals from antenna array 324, and to synchronize the digitization operations of the ADCs in ICs 310 and 320. ICs 310 and 320 each include a high-speed digital communication interface for the communication of the digitized detected signals from respective antenna arrays 314 and 324 to processing IC 340 for processing. An example of a high-speed digital communication interface may include a Mobile Industry Processor Interface (MIPI) Camera Serial Interface-2 (CSI-2) interface, a Low Voltage Differential Signaling (LVDS) interface, or the like, as needed of desired. The details of digitizing detected signals and communicating digitized signals via digital communication interfaces are known in the art, and will not be further described herein except as needed to illustrate the current embodiments. ICs 310 and 320 each include a low-speed digital communication interface that is connected to processing IC 340, whereby processing IC 340 communicates with ICs 310 and 320 to set up the operating parameters of ICs 310 and 320, to monitor the operations of ICs 310 and 320, and to modify the operating parameters of ICs 310 and 320, as needed or desired. An example of a low-speed digital communication interface may include a Serial Peripheral Interface (SPI), or the like, as needed or desired. The details of management and control of ICs via a low-speed digital communication interface are known in the art, and will not be further described herein except as needed to illustrate the current embodiments.

Processing IC 340 represents a digital signal processing device configured to extract object detection, range, speed, and incident angle information from the digitized detected signals from ICs 310 and 320. An example of processing IC 130 may include a micro-controller unit (MCU), a digital signal processor (DSP), a field-programmable gate array (FPGA) device, or the like. The details of processing digitized detected signals into object detection, range, speed, and incident angle information are known in the art, and will not be further described herein except as needed to illustrate the current embodiments.

It has been understood by the inventor to the present invention that, where multiple ICs or MMICs are utilized in the design of a radar system, the signals between the ICs or MMICs need to be highly phase coherent. In particular, the signals utilized to down-convert the detection signals (the LO signals) should be in phase, not only within each IC or MMIC, but also between the various ICs or MMICs, in order to reduce angular errors in the determination of the angle of incidence of the detected objects. As such, the signals utilized to down-convert the detection signals (the LO signals) should be in phase, not only within each of ICs 310 and 320, but also between the ICs. In a particular embodiment, ICs 310 and 320 represent identically specified ICs, such as were each IC is of a same type and part number, or where the ICs are of different types, but are from a common family of components.

Here, the placement of, and interconnections between ICs 310 and 320 may be specified, such as by a design rule or a design recommendation. Here further, ICs 310 and 320 may be configured such that, if the specified placement and interconnections are followed, the ICs are designed to ensure that the LO signals as used internally to the ICs are synchronized with each other, such as by providing an internal delay of a known duration to the internal LO in one or the other of the ICs. Here, the phase coherence of the detected signals from IC 310 will be understood to be high, that is, within a specified tolerance, the coherence of the detected signals from IC 320 will be understood to be high, and the coherence between the detected signals from IC 310 and the detected signals form IC 320 will be understood to also be high. Thus, the configuration illustrated by radar system 300 provides a simple and compact design.

However, even with such a configuration, and even where the design rules or design recommendations are followed, the phase coherence of the LO signal may not be adequate. As a first matter, thermal variations between IC 310 and IC 320, and between the ICs and a printed circuit board (PCB) or other circuit board upon which the ICs are mounted, may lead to uncompensated decoherence of the LO signal as used each IC. Moreover, it will be understood that radar system 300 may be representative of radar systems with more than one slave IC, and where the LO_OUT output from IC 310 is provided to the LO_IN inputs of two or more slave ICs. Here, additional slave ICs may be understood to be placed to the right of IC 320. Here, further, the signal traces between the LO-OUT output of IC 130, and a LO_IN input of the additional slave IC will be understood to be longer than the signal trace between IC 310 and IC 320. Here, each additional slave IC will be seen to have a longer trace length, and hence the LO signal to each additional IC will be understood to be more out of phase with the LO signal as used by IC 310.

Figure 4:
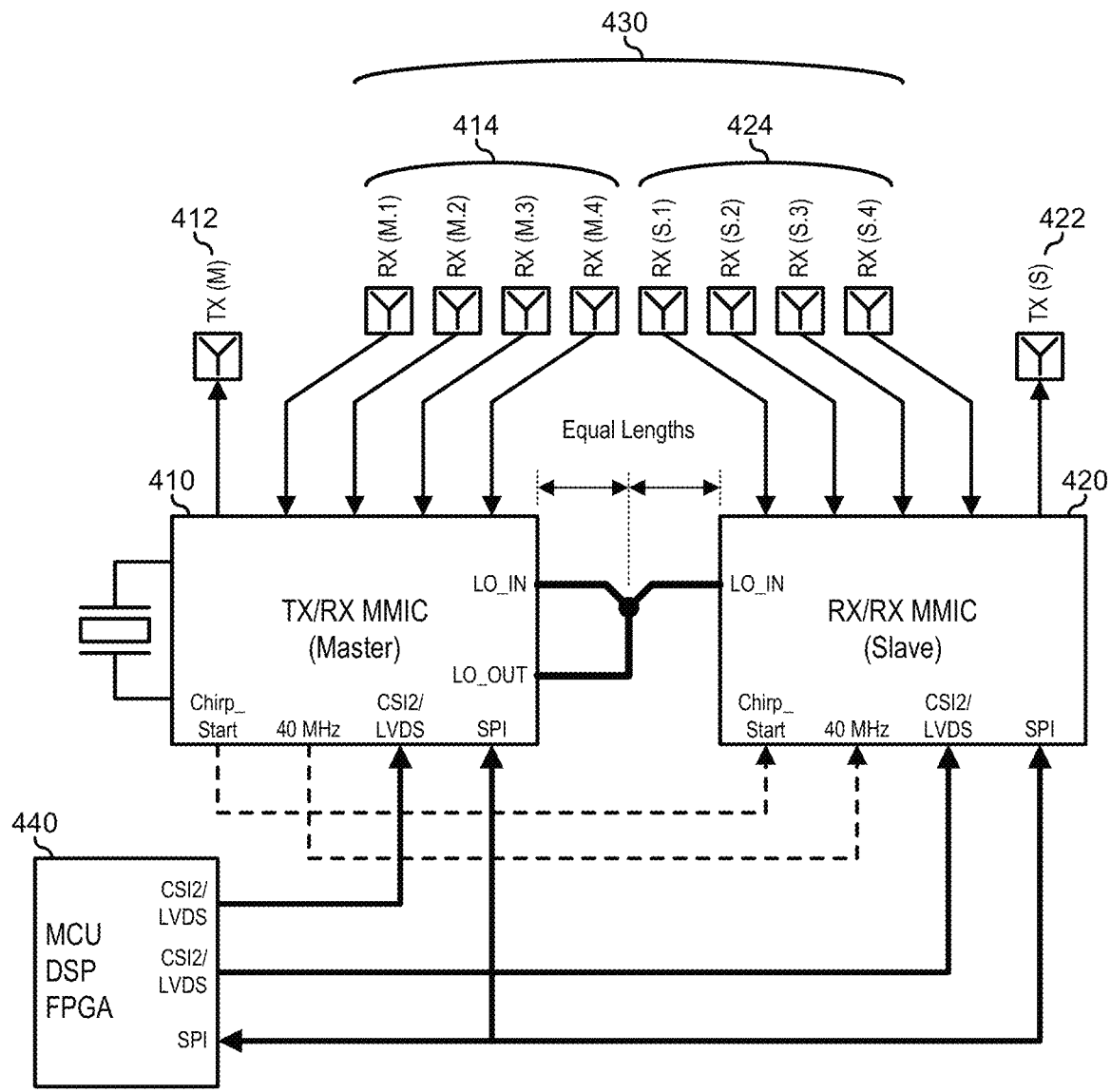

FIG. 4 illustrates a radar system 400 similar to radar systems 100 and 300. Radar system 400 includes a first transmit/receive IC 410, a second transmit/receive IC 420, and a signal processing IC 440. Transmit/receive ICs 410 and 420 represent RF ICs or MMICs which may more may not be identically specified, as needed or desired. Transmit/receive ICs 410 and 420 each include at least one transmit channel, and at least four receive channels. The transmit channel of IC 410 is connected to a transmission antenna 412, and the four receive channels of IC 410 are connected to an antenna array 414 of four receive antennas. In particular, the four receive antennas of antenna array 414 are designated, from left to right, as RX(M.1), RX(M.2), RX(M.3), and RX(M.4), and each antenna located at a lambda/2 spacing from the next antenna, as described above. Similarly, the transmit channel of IC 420 is connected to a transmission antenna 422, and the four receive channels of IC 420 are connected to an antenna array 424 of four receive antennas. In particular, the four receive antennas of antenna array 424 are designated, from left to right, as RX(S.1), RX(S.2), RX(S.3), and RX(S.4), and each antenna is located at a lambda/2 spacing from the next antenna. Moreover, antenna RX(M.4) is located at the lambda/2 spacing from antenna RX(S.1), such that the antennas of antenna arrays 414 and 424 are together configured as a single receive antenna array 430 of eight antennas.

IC 410 further includes a clock or crystal input to which, in the illustrated example, a crystal is connected. The crystal is utilized by IC 410 as an input to derive a LO signal. The LO signal derived from the crystal provided to a LO output (LO_OUT) of IC 410. As such, here, IC 410 is the master IC. IC 410 further includes a LO input (LO_IN) to receive the LO signal. IC 410 does not use the internal LO signal, but instead utilizes the LO signal from the LO input to generate a detection signal to be emitted on transmit antenna 412, and in the down-converting of the detected signals from receive antenna array 414 to the baseband frequency. The LO signal is also provided to a LO input (LO_IN) of IC 420. Here, IC 420 is the slave IC. The LO signal from LO_IN is utilized internally in IC 420 to generate a detection signal to be emitted on transmit antenna 422, and in the down-converting of the detected signals from receive antenna array 424 to the baseband frequency. IC 410 includes a chirp_start output that is provided to a chirp_start input of IC 420 to synchronize the start of the detection signals by IC 410 with the start of the detection signals by IC 420.

The crystal is further utilized by IC 410 to derive a 40 MHz clock for the operation of ADCs in the IC that digitize the down-converted detected signals from antenna array 414. IC 410 includes a 40 MHz output that is connected to a 40 MHz input of IC 420 for the operation of ADCs in IC 420 that digitize the down-converted detected signals from antenna array 424, and to synchronize the digitization operations of the ADCs in ICs 410 and 420. ICs 410 and 420 each include a high-speed digital communication interface for the communication of the digitized detected signals from respective antenna arrays 414 and 424 to processing IC 440 for processing. ICs 410 and 420 each include a low-speed digital communication interface that is connected to processing IC 440, whereby processing IC 440 communicates with ICs 410 and 420 to set up the operating parameters of ICs 410 and 420, to monitor the operations of ICs 410 and 420, and to modify the operating parameters of ICs 410 and 420, as needed or desired. Processing IC 440 represents a digital signal processing device configured to extract object detection, range, speed, and incident angle information from the digitized detected signals from ICs 410 and 420.

Note here that both ICs 410 and 420 use the common LO signal from the LO output of IC 410 via their respective LO inputs. In this way, the LO signal received by both ICs 410 and 420 have a common phase shift because the length of the signal trace between the LO output (LO_OUT) and the LO input (LO_IN) of IC 410 is the same as the length of the signal trace between the LO output (LO_OUT) and the LO input (LO_IN) of IC 420. As such, both signal traces will be subjected to common thermal environments, so that any drift in the LO signal as seen by the LO input of IC 410 will be the same as the drift in the LO signal as seen by the LO input of IC 420. Here, the pair of ICs 410 and 420 can be simplified, in that the need for internal compensation for LO signal phase variations may be reduced or eliminated. However, this advantage comes at the cost of an additional output pin on IC 410 to accommodate the LO output (LO_OUT). Further, where radar system 400 is representative of radar systems with more than one slave IC, the need to ensure that all LO signal traces between the LO output (LO_OUT) of IC 410 and the various LO inputs (LO_IN) are as long as the longest trace, resulting in a greater portion of the PCB or other circuit board upon which the ICs are mounted being utilized for LO signal trace routing. Further, the signal trace for the closest IC may need to be routed via a circuitous routing to ensure that the length of the signal trace to the closest IC is as long as the signal trace to the farthest IC.

Figure 5:
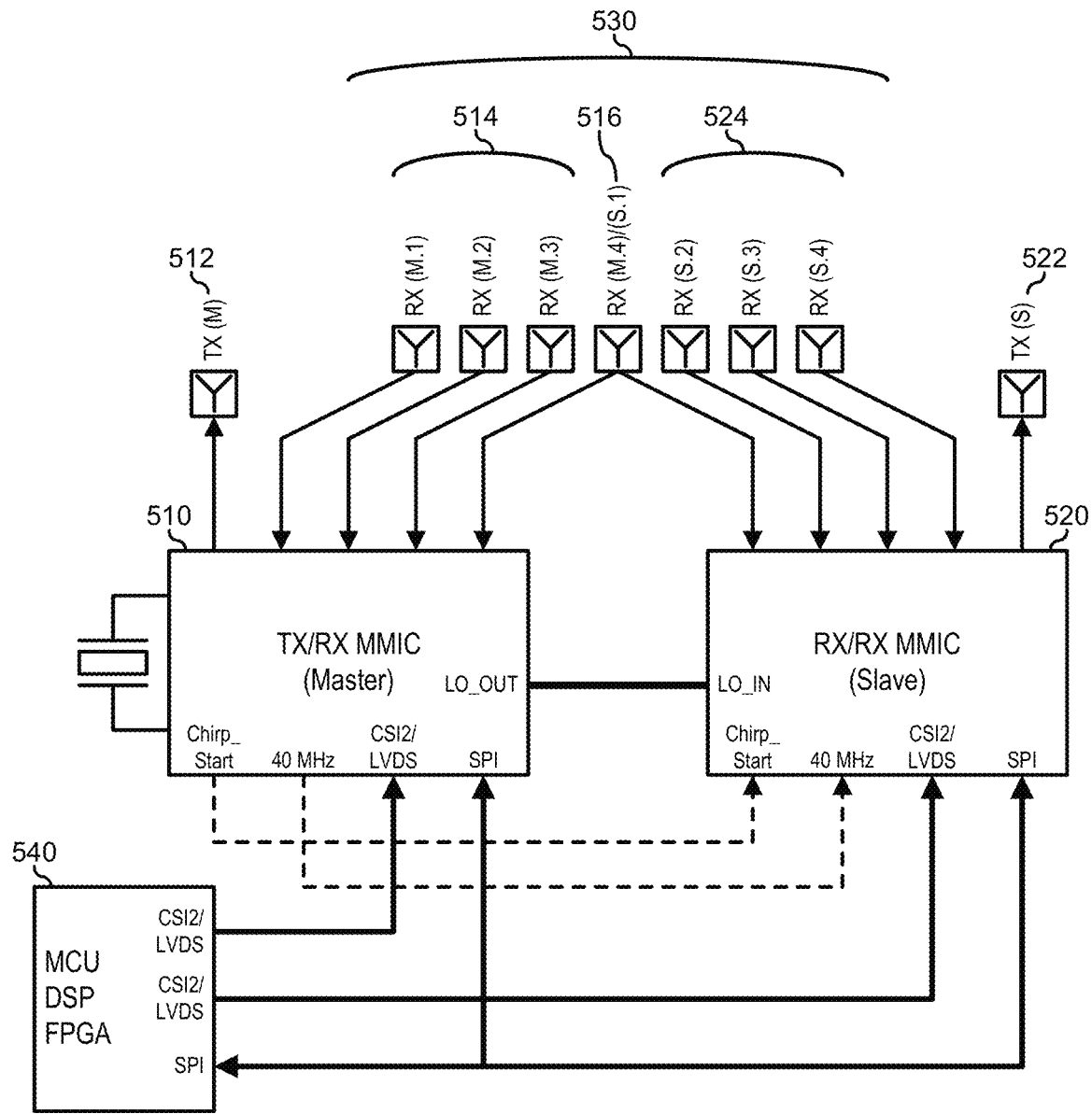
FIG. 5 is a block diagram of a radar system according to an embodiment of the present disclosure.

FIG. 5 illustrates a radar system 500 similar to radar systems 100, 300, and 400. Radar system 500 includes a first transmit/receive IC 510, a second transmit/receive IC 520, and a signal processing IC 540. Transmit/receive ICs 510 and 520 represent RF ICs or MMICs which may more may not be identically specified, as needed or desired. Transmit/receive ICs 510 and 520 each include at least one transmit channel, and at least four receive channels. The transmit channel of IC 510 is connected to a transmission antenna 512, three of the four receive channels of IC 510 are connected to an antenna array 514 of three receive antennas, and the fourth receive channel of IC 510 is connected to an antenna 516. In particular, the three receive antennas of antenna array 514 are designated, from left to right, as RX(M.1), RX(M.2), and RX(M.3), and antenna 516 is designated RX(M.4)/(S.1), and each antenna located at a lambda/2 spacing from the next antenna, as described above. Similarly, the transmit channel of IC 320 is connected to a transmission antenna 322, a first one of the four receive channels of IC 320 is connected to antenna 516, and three of the four receive channels of IC 320 are connected to an antenna array 324 of three receive antennas. In particular, the three receive antennas of antenna array 524 are designated, from left to right, as RX(S.2), RX(S.3), and RX(S.4), and each antenna is located at a lambda/2 spacing from the next antenna. Moreover, antenna RX(S.1) is located at the lambda/2 spacing from antenna RX(S.2), such that the antennas of antenna array 514, antenna 516, and antenna array 524 are together configured as a single receive antenna array 530 of seven antennas.

IC 510 further includes a clock or crystal input to which, in the illustrated example, a crystal is connected. The crystal is utilized by IC 510 as an input to derive a LO signal. The LO signal derived from the crystal is utilized internally in IC 510 to generate a detection signal to be emitted on transmit antenna 512, and in the down-converting of the detected signals from receive antenna array 514 to the baseband frequency. The LO signal is also provided to a LO output (LO_OUT) of IC 510. In this regard, IC 510 may be referred to as a "master" IC. IC 520 includes a LO input (LO_IN) to receive the LO signal from IC 510. In this regard, IC 520 may be referred to as a "slave" IC. The LO signal from LO_IN is utilized internally in IC 520 to generate a detection signal to be emitted on transmit antenna 522, and in the down-converting of the detected signals from receive antenna array 524 to the baseband frequency. IC 510 includes a chirp_start output that is provided to a chirp_start input of IC 520 to synchronize the start of the detection signals by IC 510 with the start of the detection signals by IC 520.

The crystal is further utilized by IC 510 to derive a 40 MHz clock for the operation of ADCs in the IC that digitize the down-converted detected signals from antenna array 514. IC 510 includes a 40 MHz output that is connected to a 40 MHz input of IC 520 for the operation of ADCs in IC 520 that digitize the down-converted detected signals from antenna array 524, and to synchronize the digitization operations of the ADCs in ICs 510 and 520. ICs 510 and 520 each include a high-speed digital communication interface for the communication of the digitized detected signals from respective antenna arrays 514 and 524 to processing IC 540 for processing. ICs 510 and 520 each include a low-speed digital communication interface that is connected to processing IC 540, whereby processing IC 540 communicates with ICs 510 and 520 to set up the operating parameters of ICs 510 and 520, to monitor the operations of ICs 510 and 520, and to modify the operating parameters of ICs 510 and 520, as needed or desired. Processing IC 540 represents a digital signal processing device configured to extract object detection, range, speed, and incident angle information from the digitized detected signals from ICs 510 and 520.

In a particular embodiment, ICs 510 and 520 represent identically specified ICs, such as were each IC is of a same type and part number, or where the ICs are of different types, but are from a common family of components. As such, and similarly to radar system 300, the placement of, and interconnections between ICs 510 and 520 may be specified, such as by a design rule or a design recommendation. Here, the fact that antenna 516 is connected to both the receive channel RX(M.4) and the receive channel RX(S.1) results in IC 540 receiving two sets of four digitized detected signals: a first set from IC 510 (i.e., RX(M.1)-RX(M.4)) and as second set from IC 520 (i.e., RX(S.1)-RX(S.4)). However, because the reflected signal received by receive channel RX(M.4) in IC 510 is also the reflected signal received by receive channel RX(S.1) in IC 520, any phase difference between the digitized detected signal from RX(M.4) and the digitized detected signal from RX(S.1), as seen by IC 540, will not be understood to represent an actual phase difference in the reflected signals from those channels, but will instead be understood to represent an estimate in the phase difference between the LO signal in IC 510 and the LO signal in IC 520.

Here, IC 540 operates to detect the phase difference between the digitized detected signal from RX(M.4) and the digitized detected signal from RX(S.1), and to compensate for the phase difference in the digital domain, thereby aligning the digitized detected signals from ICs 510 and 520. In a particular embodiment, IC 540 operates to perform a time domain correlation of the IF signals from RX(M.4) and RX(S.1) to yield a time offset between the signals, and utilizes the time offset to correct the sets of values as needed. In another embodiment, IC 540 operates to perform a Fast Fourier Transform (FFT) on the IF signals received from ICs 510 and 520. The FFT will result in expected frequency peaks associated with the objects in the detection field. The frequencies of the peaks from all of the receive channels RX(M.1)-RX(M.4) and RX(S.1)-RX(S.4) will be the same. Moreover, the phase offsets between the receive channels RX(M.1)-RX(M.4) will each be expected to have a phase offset indicative of the incident angle of the objects detected, as will the phase offsets between the receive channels RX(S.1)-RX(S.4). However, because the reflected signal for each object, as received by receive channel RX(M.4) and by receive channel RX(S.1) is the same, the phase offsets for each object (i.e., each frequency peak) between receive channels RX(M.4) and RX(S.1) is representative of the phase offset in the LO signals in respective ICs 510 and 540. Here, IC 540 utilizes the phase offset between receive channels RX(M.4) and RX(S.1) to correct the sets of values as needed.

In a particular embodiment, radar system 500 operates to set up the correction values (i.e., the time offset in the time-domain IF signals, or the phase offset in the frequency-domain signals) in an initial operation, such as during a calibration phase in the operation of radar system 500. The correction values can then be utilized for subsequent signal processing by IC 540. In a variation, radar system 500 can detect a temperature difference between ICs 510 and 520, such as during a normal operation phase in the operation of radar system 500, and can recalculate the correction values when the temperature difference exceeds a threshold value. In another variation, radar system 500 can periodically set up the corrections values. For example, IC 540 can be configured to recalculate the correction values at a predetermined rate, such as ever second, every 500 milliseconds, or at another predetermined rate as needed or desired. This embodiment may provide advantages in that, where the signal processing resources of IC 540 are sparse, the additional processing needed to calculate the correction values can be reduced. In another embodiment, radar system 500 operates to continuously calculate the correction values. Here, where the signal processing resources of IC 540 are more abundant, the additional processing needed to continuously calculate the correction values may not present an excessive burden on the IC.

It will be understood that the LO signal phase offset between multiple ICs may be estimated and corrected as needed or desired. For example, where a radar system includes three IC, each with four receive channels, then a single antenna that is shared between the first and second ICs can provide an estimate of the LO phase offset between the first and second ICs, and a single antenna that is shared between the second and third ICs can provide an estimate of the LO phase offset between the second and third ICs. The LO phase offsets between additional ICs can similarly be estimated and corrected as needed or desired. Note that the theoretical virtual aperture of radar systems 300 and 400 will be equal to an equivalent SIMO radar system with 16 antennas (i.e., 2 (transmit antennas)×8 (receive antennas)= 16). In contrast, the theoretical virtual aperture of radar system 500 will be equal to an equivalent SIMO radar system with 14 antennas (i.e., 2 (transmit antennas)×7 (receive antennas)=14). As such, the theoretical angular resolution of radar systems 300 and 400 is greater than the theoretical angular resolution of radar system 500. However, in practice, the more accurate measure of the LO signal phase differences between ICs 510 and 520, as provided by radar system 500 may offset any loss in resolution from the smaller theoretical virtual aperture.

Figure 6:
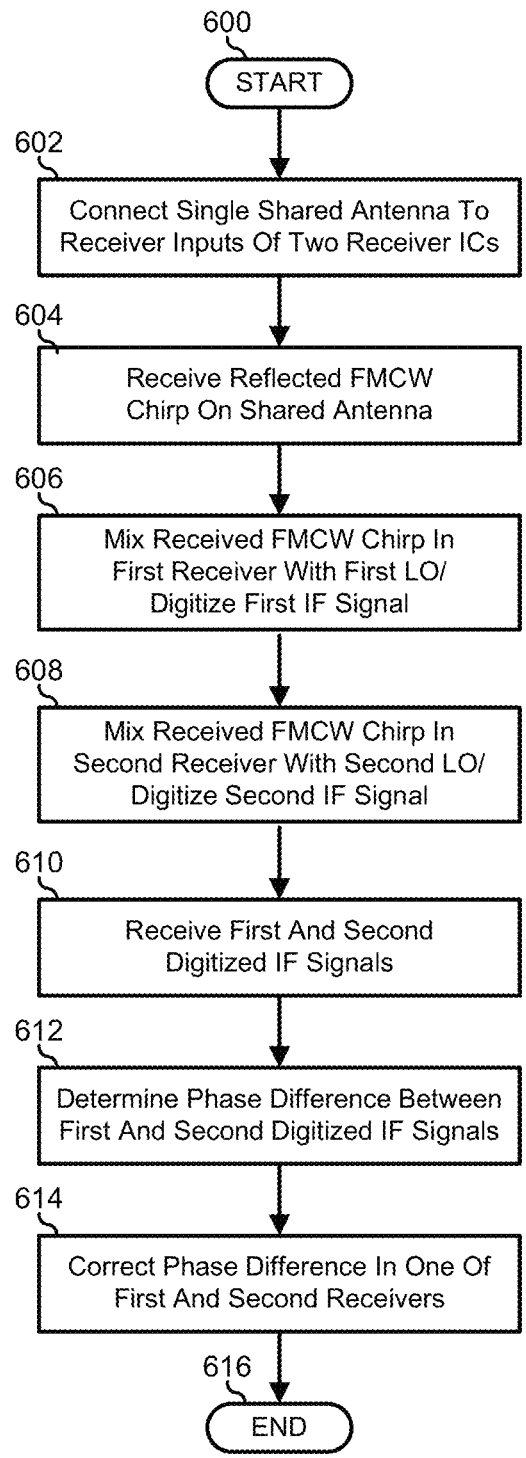
FIG. 6 is a flow-chart illustrating a method for local oscillator (LO) drift estimation and compensation in cascaded sensors in aa radar system according to an embodiment of the present disclosure.

FIG. 6 illustrates a method for local oscillator (LO) drift estimation and compensation in a cascaded radar system, starting at block 600. A single antenna is connected to the receiver inputs of two receiver ICs in block 602. For example, where each receiver IC includes four receiver channels, an array of seven antennas can be provided that are spaced with spacing of lambda/2 or less. Here of three of the receiver channels on each receiver IC can be connected to an associated antenna. The fourth receiver channel of each receiver IC can be connected to a shared antenna. Typically, a middle antenna of the array of seven antennas will be the shared antenna.

A reflected FMCW chirp is received on the shared antenna in block 604. Here, the cascaded radar system can include one or more transmit channels, either on one or more separate transmit IC, or on one or both of the first and second receiver ICs. The transmit channels can emit encoded FMCW chirps that can be reflected off of objects in a detection space of the radar system. The reflected FMCW chirps can be detected by the shared antenna.

The FMCW chirp received by the first receiver IC is mixed with a first LO signal to obtain a first IF signal, and the first IF signal is digitized in block 606. For example, the first receiver IC can generate the first LO signal, or can receive the first LO signal from another external source. The resulting IF signal will have a phase shift that is related to the phase shift of the first LO signal. The first IF signal can be digitized using an ADC.

The FMCW chirp received by the second receiver IC is mixed with a second LO signal to obtain a second IF signal, and the second IF signal is digitized in block 608. For example, the second receiver IC can generate the second LO signal, or can receive the second LO signal from another external source. The resulting IF signal will have a phase shift that is related to the phase shift of the second LO signal. The first and second LO signals may be based upon a common LO signal, for example where one of the receiver ICs generates the common LO signal, and provides the common LO signal to the other receiver IC. The second IF signal can be digitized using an ADC.

The first and second digitized IF signals are received in block 610. For example, a digital signal processing IC can receive the digitized IF signals from the first and second receiver ICs.

A phase difference between the first and second digitized IF signals is determined in block 612. For example, the digital signal processing IC can determine the phase difference in the time-domain or in the frequency-domain, as needed or desired.

The phase difference is corrected in one the receiver outputs of one of the first and second ICs in block 614, and the method ends in block 616.

Figure 7:
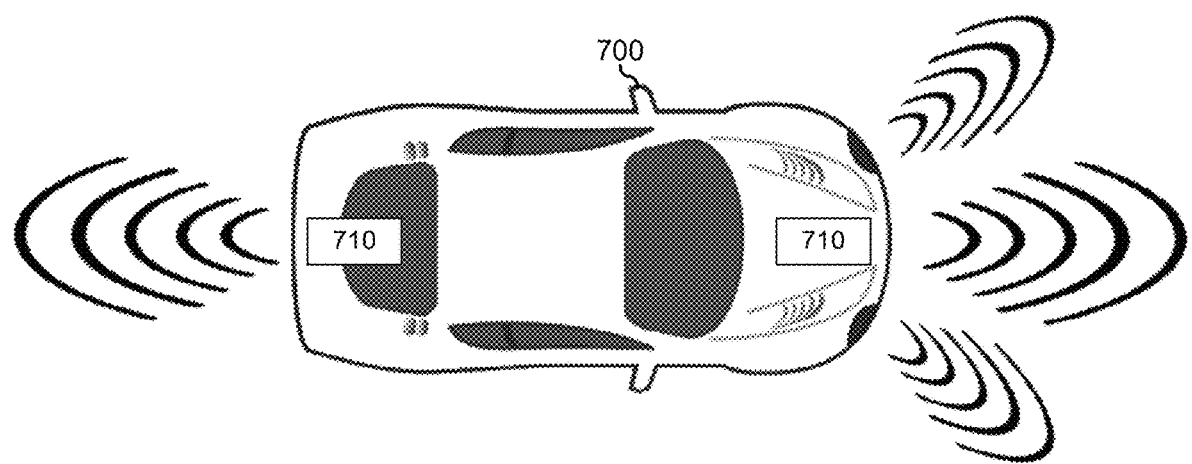
FIG. 7 illustrates an automobile including a radar system according to an embodiment of the present disclosure.

FIG. 7 illustrates an automobile 700 that includes one or more radar system 710. Automobile 700 represents any kind of vehicle that utilizes a radar system for object detecting objects, and providing range, speed, and incident angle information related to the object. An example of automobile 700 may include a car, a self-driving car, a truck, a van, a motorcycle, a utility vehicle, a boat, a ship, a drone, an aircraft, an emergency services vehicle, or the like. Radar system 710 may be in communication with an autonatic braking system, an adaptive cruise control system, a collision avoidance system, or another system of automobile 700, as needed or desired to affect the operation of the automobile. Radar system 710 may be similar to the radar systems described herein, an may operate in accordance with the teaching disclosed herein.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A frequency modulated continuous wave (FMCW) radar system, comprising:
    an antenna array including C antennas, where C=A+B−1, and where A, B, and C are integers greater than one;
    a first integrated circuit (IC) device including A first sensor inputs, each first sensor input coupled to a first A of the antennas, the first IC device configured to receive on each first sensor input an associated first reflected signal, to mix the first reflected signals to associated first baseband signals based upon a first local oscillator (LO) signal, and to output the first baseband signals, wherein the first LO signal has a first phase shift;
    a second IC device including B second sensor inputs, each second sensor input coupled to a last B of the antennas such that a common one of the first sensor inputs and a common one of the second sensor inputs are both coupled to a common antenna, the second IC device configured to receive on each second sensor input an associated second reflected signal, to mix the second reflected signals to associated second baseband signals based upon a second local oscillator (LO) signal, and to output the second baseband signals, wherein the second LO signal has a second phase shift, wherein the first and second LO signals are based upon a common LO signal, and wherein a common first baseband signal is associated with the common first sensor input and a common second baseband signal is associated with the common second sensor input; and
    a processor configured to:
        receive the first baseband signals and the second baseband signals;
        detect a temperature difference between the first IC and the second IC;
        in response to the processor detecting the temperature difference and the temperature difference exceeding a threshold, determine a difference between the first phase shift and the second phase shift based upon the common first baseband signal and the common second baseband signal; and
        correct at least one of the first baseband signals and the second baseband signals based upon the difference between the first phase shift and the second phase shift.

2. The FMCW radar system of claim 1, further comprising:
    a processor configured to receive the first baseband signals and the second baseband signals, to determine a difference between the first phase shift and the second phase shift based upon the common first baseband signal and the common second baseband signal, and to correct at least one of the first baseband signals and the second baseband signals based upon the difference between the first phase shift and the second phase shift.

3. The FMCW radar system of claim 2, wherein in determining the difference between the first phase shift and the second phase shift, the processor is further configured to determine a delay time between the first common baseband signal and the second common baseband signal.

4. The FMCW radar system of claim 3, wherein in correcting the at least one of the first baseband signals and the second baseband signals, the processor is further configured to delay the at least one of the first baseband signals and the second baseband signals by the delay time.

5. The FMCW radar system of claim 2, wherein:
    the first IC device is further configured to digitize the first baseband signals, wherein outputting the first baseband signals comprises outputting first digitized signals including a common first digitized signal associated with the common first sensor input; and
    the second IC device is further configured to digitize the second baseband signals, wherein outputting the second baseband signals comprises outputting second digitized signals including a common second digitized signal associated with the common second sensor input.

6. The FMCW radar system of claim 5, wherein the processor is further configured to perform a Fast Fourier Transform (FFT) on the first digitized baseband signals to obtain first transformed signals including a common first transformed signal associated with the common first digitized signal, and to perform the FFT on the second digitized baseband signals to obtain second transformed signals including a common second transformed signal associated with the common second digitized signal.

7. The FMCW radar system of claim 6, wherein in determining the difference between the first phase shift and the second phase shift, the processor is further configured to determine a complex phase shift between common first transformed signal and the common second transformed signal in a frequency domain.

8. The FMCW radar system of claim 7, wherein in correcting the at least one of the first baseband signals and the second baseband signals, the processor is further configured to shift a phase of at least one of the transformed first baseband signals and the transformed second baseband signals based upon the complex phase shift.

9. The FMCW radar system of claim 1, wherein:
the first IC device is further configured to generate the first LO signal; and
the second IC device is further configured to receive the second LO signal from the first IC device.

10. The radar system of claim 1, wherein the antennas of the antenna array are arranged in a line and each antenna is spaced apart from a next antenna at a distance of lambda/2 or less, where lambda is a wavelength of a carrier wave of a FMCW chirp of the FMCW radar system.

11. A method for compensating for local oscillator (LO) phase shifts in cascaded integrated circuit (IC) devices of a frequency modulated continuous wave (FMCW) radar system, the method comprising:
providing an antenna array of the FMCW radar system, the antenna array including C antennas, where C=A+B−1, and where A, B, and C are integers greater than one;
coupling A first sensor inputs of a first IC device to a first A of the antennas;
receiving, on each first sensor input an associated first reflected signal;
mixing, in the first IC device, the first reflected signals to associated first baseband signals based upon a first local oscillator (LO) signal, wherein the first LO signal has a first phase shift, and wherein a common first baseband signal is associated with the common first sensor input;
outputting, from the first IC device, the first baseband signals;
coupling B second sensor inputs of a second IC device to a last B of the antennas such that a common one of the first sensor inputs and a common one of the second sensor inputs are both coupled to a common antenna;
receiving, on each second sensor input an associated second reflected signal;
mixing, in the second IC device, the second reflected signals to associated second baseband signals based upon a second local oscillator (LO) signal, wherein the second LO signal has a second phase shift, wherein the first and second LO signals are based upon a common LO signal, and wherein a common second baseband signal is associated with the common second sensor input;
outputting, from the second IC device, the second baseband signals;
receiving, by a processor of the FMCW radar system, the first baseband signals and the second baseband signals;
detecting, by the processor, a temperature difference between the first IC and the second IC;
in response to the processor detecting the temperature difference and the temperature difference exceeding a threshold, determining, by the processor, a difference between the first phase shift and the second phase shift based upon the common first baseband signal and the common second baseband signal; and
correcting, by the processor, at least one of the first baseband signals and the second baseband signals based upon the difference between the first phase shift and the second phase shift.

12. The method of claim 11, further comprising:
receiving, by a processor of the FMCW radar system, the first baseband signals and the second baseband signals;
determining, by the processor, a difference between the first phase shift and the second phase shift based upon the common first baseband signal and the common second baseband signal; and
correcting, by the processor, at least one of the first baseband signals and the second baseband signals based upon the difference between the first phase shift and the second phase shift.

13. The method of claim 12, wherein in determining the difference between the first phase shift and the second phase shift, the method further comprises:
determining, by the processor, a delay time between the first common baseband signal and the second common baseband signal.

14. The method of claim 13, wherein in correcting the at least one of the first baseband signals and the second baseband signals, the method further comprises:
delaying, by the processor, the at least one of the first baseband signals and the second baseband signals by the delay time.

15. The method of claim 12, further comprising:
digitizing, by the first IC device, the first baseband signals, wherein outputting the first baseband signals comprises outputting first digitized signals including a common first digitized signal associated with the common first sensor input; and
digitizing, by the second IC device, the second baseband signals, wherein outputting the second baseband signals comprises outputting second digitized signals including a common second digitized signal associated with the common second sensor input.

16. The method of claim 15, further comprising;
performing, by the processor, a Fast Fourier Transform (FFT) on the first digitized baseband signals to obtain first transformed signals including a common first transformed signal associated with the common first digitized signal; and
performing, by the processor, the FFT on the second digitized baseband signals to obtain second transformed signals including a common second transformed signal associated with the common second digitized signal.

17. The method of claim 16, wherein in determining the difference between the first phase shift and the second phase shift, the method further comprises:
determining, by the processor, a complex phase shift between common first transformed signal and the common second transformed signal in a frequency domain.

18. The method of claim 17, wherein in correcting the at least one of the first baseband signals and the second baseband signals, the method further comprises:
shifting, by the processor, a phase of at least one of the transformed first baseband signals and the transformed second baseband signals based upon the complex phase shift.

19. The method of claim 11, further comprising:
generating, by the first IC device, the first LO signal; and
receiving, by the second IC device, the second LO signal from the first IC device.

20. A frequency modulated continuous wave (FMCW) radar system, comprising:
a transmitter configured to provide a plurality of FMCW chirps; and a receiver, comprising:
  an antenna array including C antennas, where C=A+B−1, and where A, B, and c are integers greater than one;
  a first integrated circuit (IC) device including A first sensor inputs, each first sensor input coupled to a first A of the antennas, the first IC device configured to receive on each first sensor input an associated first reflected signal associated with the FMCW chirps, to mix the first reflected signals to associated first baseband signals based upon a first local oscillator (LO) signal, and to output the first baseband signals, wherein the first LO signal has a first phase shift;
a second IC device including B second sensor inputs, each second sensor input coupled to a last B of the antennas such that a common one of the first sensor inputs and a common one of the second sensor inputs are both coupled to a common antenna, the second IC device configured to receive on each second sensor input an associated second reflected signal associated with the FMCW chirps, to mix the second reflected signals to associated second baseband signals based upon a second local oscillator (LO) signal, and to output the second baseband signals, wherein the second LO signal has a second phase shift, wherein the first and second LO signals are based upon a common LO signal, and wherein a common first baseband signal is associated with the common first sensor input and a common second baseband signal is associated with the common second sensor input; and
a processor configured to:
  receive the first baseband signals and the second baseband signals;
  detect a temperature difference between the first IC device and the second IC device;
  in response to the processor detecting the temperature difference and the temperature difference exceeding a threshold, determine a difference between the first phase shift and the second phase shift based upon the common first baseband signal and the common second baseband signal; and
  correct at least one of the first baseband signals and the second baseband signals based upon the difference between the first phase shift and the second phase shift.

* * * * *